United States Patent
Zhang et al.

(10) Patent No.: US 12,430,363 B2
(45) Date of Patent: Sep. 30, 2025

(54) DATA PARTITION STORAGE SYSTEM, METHOD, AND NON-TRANSITORY COMPUTER READABLE MEDIUM

(71) Applicant: Alibaba Cloud Computing Co., Ltd., Zhejiang (CN)

(72) Inventors: Teng Zhang, Hangzhou (CN); Xin Cai, Hangzhou (CN); Tieying Zhang, Hangzhou (CN); Jianying Wang, Hangzhou (CN); Gui Huang, Hangzhou (CN); Feifei Li, Hangzhou (CN)

(73) Assignee: Alibaba Cloud Computing Co., Ltd., Hangzhou (CN)

( * ) Notice: Subject to any disclaimer, the term of this patent is extended or adjusted under 35 U.S.C. 154(b) by 0 days.

(21) Appl. No.: 18/183,453

(22) Filed: Mar. 14, 2023

(65) Prior Publication Data

US 2023/0214408 A1    Jul. 6, 2023

Related U.S. Application Data

(63) Continuation of application No. PCT/CN2021/117688, filed on Sep. 10, 2021.

(30) Foreign Application Priority Data

Sep. 17, 2020    (CN) .......................... 202010977031.8

(51) Int. Cl.
*G06F 16/00*    (2019.01)
*G06F 16/242*    (2019.01)
*G06F 16/27*    (2019.01)

(52) U.S. Cl.
CPC ........ *G06F 16/278* (2019.01); *G06F 16/2448* (2019.01)

(58) Field of Classification Search
CPC .......................... G06F 16/278; G06F 16/2448
(Continued)

(56) References Cited

U.S. PATENT DOCUMENTS 9,052,831 B1 * 6/2015 Stefani .................. G06F 3/0644
9,053,167 B1 * 6/2015 Swift ...................... G06F 16/27
(Continued)

FOREIGN PATENT DOCUMENTS

CN    102902628 A    1/2013
CN    110531938 A    12/2019
(Continued)

OTHER PUBLICATIONS

PCT International Search Report and Written Opinion mailed Nov. 25, 2021, issued in corresponding International Application No. PCT/CN2021/117688 (18 pgs.).

(Continued)

*Primary Examiner* — Michelle N Owyang
(74) *Attorney, Agent, or Firm* — Finnegan, Henderson, Farabow, Garrett & Dunner, LLP

(57) ABSTRACT

A data partition storage system is provided. The system includes: a data analysis device, configured to determine, according to a data feature of target data comprised in a database, a heat level corresponding to the target data; and a database kernel, deployed on a target device different from the data analysis device to form the database, and configured to: acquire the heat level corresponding to the target data transmitted by the data analysis device; and store the target data in a storage area corresponding to the heat level.

20 Claims, 5 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 10,176,212 B1* | 1/2019 | Prohofsky | G06F 16/2365 |
| 11,042,536 B1* | 6/2021 | Barnes | G06F 16/26 |
| 2018/0196606 A1* | 7/2018 | Chen | G06F 11/2097 |
| 2018/0253468 A1* | 9/2018 | Gurajada | G06F 16/2255 |
| 2018/0285008 A1* | 10/2018 | Challagolla | G06F 3/067 |
| 2018/0322184 A1 | 11/2018 | Voss et al. | |
| 2021/0240539 A1* | 8/2021 | Murthy | G06F 11/3452 |
| 2022/0043752 A1* | 2/2022 | Hua | G06N 20/00 |

FOREIGN PATENT DOCUMENTS

| | | |
|---|---|---|
| CN | 110543509 A | 12/2019 |
| CN | 110888861 A | 3/2020 |
| CN | 111090392 A | 5/2020 |
| CN | 111930848 A | 11/2020 |
| WO | WO 2022/057739 A1 | 3/2022 |

OTHER PUBLICATIONS

First Chinese Search Report issued in corresponding Chinese Application No. 202010977031.8 on Nov. 18, 2020 (1 page).

* cited by examiner

DATA PARTITION STORAGE SYSTEM, METHOD, AND NON-TRANSITORY COMPUTER READABLE MEDIUM

CROSS-REFERENCE TO RELATED APPLICATIONS

The present disclosure claims the benefits of priority to PCT Application No. PCT/CN2021/117688, filed on Sep. 10, 2021, which claims the benefits of priority to Chinese Application No. 202010977031.8, filed on Sep. 17, 2020, both of which are incorporated herein by reference in their entireties.

TECHNICAL FIELD

The present disclosure relates to data processing technologies, and in particular, to a data partition storage system, method, and non-transitory computer readable medium.

BACKGROUND

With the rapid development and continuous operation of services, a large amount of data generated by a service system needs to be stored in a database, for users to perform accessing according to service requirements. However, with the continuous increasing amount of data stored in a same database, access performance of the database is greatly reduced. In the related art, a large amount of data is usually stored by increasing the quantity of databases, which not only increases overheads of data storage, but also increases complexity of service logic of the service system.

SUMMARY OF THE DISCLOSURE

Embodiments of the present disclosure provide a data partition storage system. The data partition storage system includes a data analysis device, configured to determine, according to a data feature of target data included in a database, a heat level corresponding to the target data; and a database kernel, deployed on a target device different from the data analysis device to form the database, and configured to: acquire the heat level corresponding to the target data transmitted by the data analysis device; and store the target data in a storage area corresponding to the heat level.

Embodiments of the present disclosure provide a data partition storage method, applied to a data analysis device. The method includes determining, according to a data feature of target data in a target database, a heat level corresponding to the target data; and sending identification information and the heat level of the target data to the target database in an associated manner, so that the target database stores the target data in a corresponding storage area according to the heat level.

Embodiments of the present disclosure provide a non-transitory computer readable medium that stores a set of instructions that is executable by one or more processors of an apparatus to cause the apparatus perform determining, according to a data feature of target data in a target database, a heat level corresponding to the target data; and sending identification information and the heat level of the target data to the target database in an associated manner, so that the target database stores the target data in a corresponding storage area according to the heat level.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

With the rapid development and continuous operation of services, a large amount of data generated by a service system needs to be stored in a database, for users to perform accessing according to service requirements. However, with the continuous increasing amount of data in a same database, access performance of the database is greatly reduced. The data included in the database can be divided into hot data that needs to be accessed frequently and cold data that is not accessed or rarely accessed. A large amount of cold data occupies high-performance storage space of the database, which causes a waste of database resources.

Generally, an online database is usually used to store the hot data, and a historical database is used to store the cold data. However, with this method, on the one hand, code of the service system needs to be modified, so as to implement connection with the online database and the historical database respectively, which increases complexity of service logic of the service system, and increases development costs. On the other hand, the online database and the historical database need to be maintained separately, which increases operation and maintenance costs.

Therefore, to resolve the foregoing technical problems, a method for improving a data partition storage is provided in the present disclosure. Detailed descriptions are provided below with reference to the embodiments.

Figure 1:
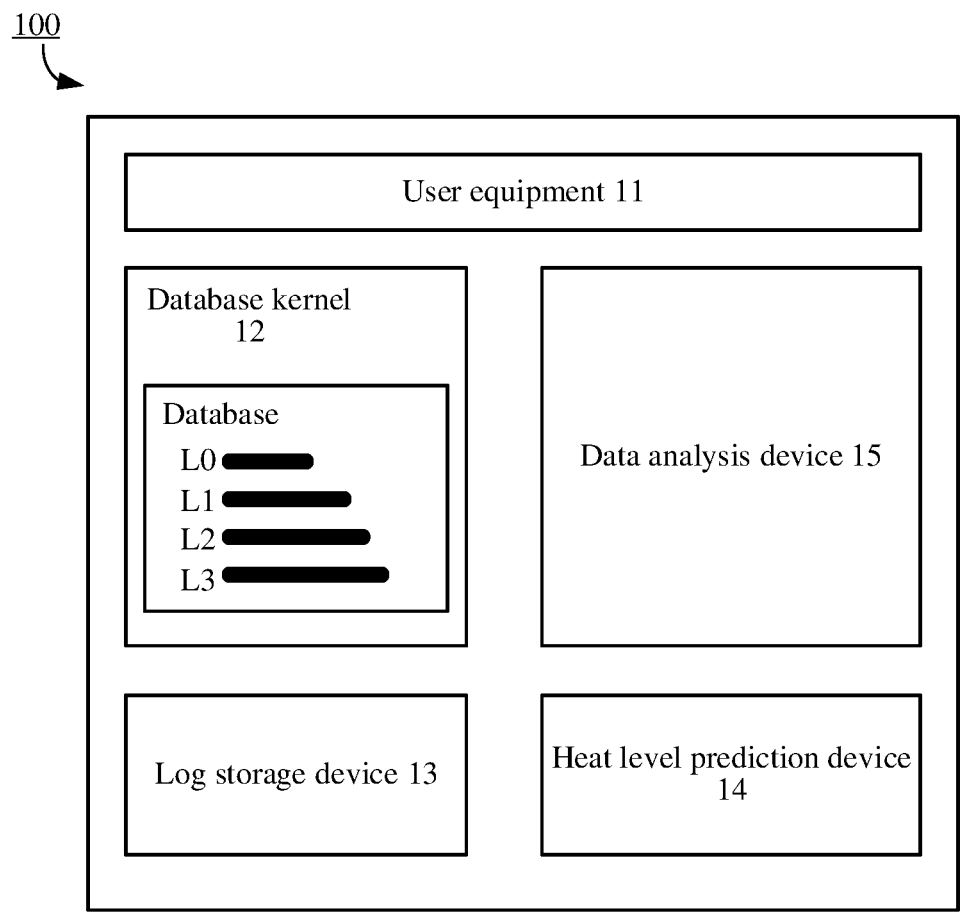
FIG. 1 is a schematic architectural diagram of an example data partition storage system, according to some embodiments of the present disclosure.

FIG. 1 is a schematic architectural diagram of a data partition storage system 100, according to some embodiments of the present disclosure. As shown in FIG. 1, data partition storage system 100 includes user equipment 11, a database kernel 12, a log storage device 13, a heat level prediction device 14, and a data analysis device 15.

User equipment 11 include a mobile phone, a PC, a tablet device, a notebook computer, a personal digital assistant (PDA), a wearable device (such as smart glasses or a smartwatch), and the like. This is not limited in one or more embodiments of the present disclosure. A user may send a data definition language (DDL) statement or a data manipulation language (DML) statement to a database in a target device through user equipment 11.

Database kernel 12 is deployed in a target device different from data analysis device 15, and the target device forms the database by running database kernel 12. The database stores data generated by various service systems. For example, the data includes order data, logistics data, and the like. In addition, the database may use a multi-layer storage structure, and each storage area in the storage structure has a corresponding heat level. As shown in FIG. 1, the database includes a plurality of storage areas such as L0, L1, L2, and L3. Storage areas L0, L1, and L2 may use a solid-state disk to store the hot data that needs to be frequently accessed, and data area L3 may use a relatively cheap storage medium to store the cold data that does not need to be frequently accessed. The database may use a corresponding storage engine to specify the storage structure of the data included in the database. For example, a log structured-merge tree (LSM-tree) storage engine is used to specify the layered storage structure. In some embodiments, a same heat level may correspond to one or more storage areas, and heat levels may be divided according to actual requirements. For example, the heat levels include a hot data and a cold data, or the heat levels may include a first level, a second level, and a third level. For example, the data with a heat level of hot data refers to hot data, and the data with a heat level of cold data refers to cold data. This is not limited in the present disclosure. The database in the target device may be a relational database, a non-relational database, a cloud database, or the like. This is not limited in the present disclosure.

In some embodiments, user equipment 11 is configured to send a DDL statement to the target device to start a storage mode of partition storage for a specified database table in the database, and a corresponding identification record is inserted into meta information of the database. The identification record is used for marking that the specified database table is in the partition storage mode. For example, assuming that the specified database table is T1, the DDL statement may be ALTER Table T1 HOTCOLD=SMART/RULE. The SMART mode is the partition storage mode. In this case, the data partition storage system 100 may automatically perform partition storage on the data included in the specified database table. The RULE mode is a rule mode that supports user configuration. In this case, the data partition storage system 100 may receive a rule of partition storage configured by the user for the data included in the specified database table. Assuming that the meta information of the database is recorded in an information_schema table, an identification record of whether the specified database table is in the SMART mode or the RULE mode may be added to the information_schema table.

In some embodiments, data analysis device 15 is configured to monitor the storage modes of the database tables in the database by polling the meta information in the database. In addition, data analysis device 15 is configured to derive a corresponding sub-process for a database table in the partition storage mode, and the sub-process is used for acquiring a data feature of the data included in the database table. Since sub-processes are derived and each sub-process is in charge of the processes of the partition storage of the data included in each database table, the impact on an operation process of a main process of data analysis device 15 can be avoided, and stability of the operation the data analysis device 15 is improved.

Data analysis device 15 is configured to acquire the data feature of the target data included in the database of the target device, and then the heat level corresponding to the target data is determined according to the data feature. The data feature may include an access frequency, the quantity of updates per day, the quantity of queries per day, a latest update time, and the like. The heat level is used for indicating the frequency of the target data being accessed or invoked, which is not limited in the present disclosure.

Log storage device 13 is configured to store an SQL log of the database acquired from the target device. Log storage device 13 is located on the same physical device as the target device. In some embodiments, log storage device 13 and the target device are located on different physical devices. This is not limited in the present disclosure.

In some embodiments, data analysis device 15 is configured to acquire the SQL log corresponding to the target data from log storage device 13. In some embodiments, data analysis device 15 is configured to directly acquire the SQL log corresponding to the target data from the database in the target device. This is not limited in the present disclosure.

In some embodiments, data analysis device 15 is configured to parse the acquired SQL log and determine the data feature of the target data. Data analysis device 15 is configured to acquire the accurate data feature of the target data from the SQL log, thereby improving accuracy of subsequent prediction of the heat level corresponding to the target data. For example, the SQL log records a time point at which the target data is accessed each time, then data analysis device 15 is configured to determine the frequency at which the target data is accessed by parsing the SQL log. Changes of the target database during operation may be recorded in the SQL log, and the SQL log may include a query log, an update log, a transaction log, and the like.

In some embodiments, data analysis device 15 is configured to input the acquired data feature of the target data into a pre-trained thermal analysis model, thereby obtaining the heat level of the target data outputted by the thermal analysis model. The thermal analysis model is deployed in heat level prediction device 14. Heat level prediction device 14 is another device different from data analysis device 15 in data partition storage system 100. In some embodiments, the thermal analysis model is directly deployed on data analysis device 15, which is not limited in the present disclosure. The thermal analysis model may be a neural network model such as a convolutional neural network (CNN) model, a recurrent neural network (RNN) model, or a generative adversarial network (GAN) model. This is not limited in the present disclosure.

In some embodiments, when the thermal analysis model is deployed in heat level prediction device 14, heat level prediction device 14 is configured to input the data feature of the target data into the thermal analysis model to obtain the heat level of the target data outputted by the thermal analysis model, and heat level prediction device 14 is further configured to send the heat level of the target data to data analysis device 15, so that data analysis device 15 may directly receive the heat level of the target data sent by heat level prediction device 14.

In some embodiments, data analysis device 15 is configured to generate a target file including identification information and the heat level of the target data. Data analysis device 15 is configured to transmit the target file to the target device. According to the target file, database kernel 12 in the target device is configured to store the target data to the storage area corresponding to the heat level of the target data. The target file is be named with the identification information of the database table to which the target data belongs. For example, if the identification information of the database table to which the target data belongs is D1, the name of the target file corresponding to the target data may also be D1.

In some embodiments, data analysis device 15 is configured to send a notification message of data migration to the target device after determining the heat level corresponding to the target data. Database kernel 12 in the target device is configured to start to migrate the target data to the storage area corresponding to the heat level of the target data after receiving the notification message. Data analysis device 15 is configured to control a process of migration between storage areas corresponding to the data included in the database. For example, data analysis device 15 is configured to control the data migration of the database to be performed in a time period with low load, which can avoid interference with a normal transaction processing process of the database. This time period may be early morning of each day. This is not limited in the present disclosure.

In some embodiments, database kernel 12 is configured to store the target data in the storage area corresponding to the heat level according to the heat level of the target data acquired from data analysis device 15. Therefore, decoupling of the process of determining the heat level of the target data and the process of partition storage of the target data can be realized, the impact of the process of determining the heat level of the target data on database performance can be avoided, interference with the normal transaction processing process of the database is avoided, and the stability of the database is improved. In addition, the accuracy of the determined heat level of the target data can be improved by deploying a complex thermal analysis model on data analysis device 15 or heat level prediction device 14, therefore capability for accurately predicting the heat level is provided.

In some embodiments, database kernel 12 is configured to determine a current storage area at which the target data is located, and match the acquired heat level of the target data with the current storage area. When the acquired heat level does not match the current storage area, the target data is migrated from the current storage area to the storage area corresponding to the heat level. For example, database kernel 12 is configured to compare the acquired heat level of the target data with a heat level corresponding to the current storage area. When the acquired heat level is inconsistent with the heat level corresponding to the current storage area, the target data is migrated from the current storage area to the storage area corresponding to the heat level; or in some embodiments, when the acquired heat level is lower than the heat level corresponding to the current storage area, the target data is migrated from the current storage area to the storage area corresponding to the heat level. This is not limited in the present disclosure.

In some embodiments, a speed at which database kernel 12 accesses each storage area is positively related to the heat level corresponding to the storage area. Database kernel 12 is configured to perform partition storage according to the heat level, thereby improving throughput of the database system. The access speed to the data corresponding to a relatively high heat level in the database is ensured and simultaneously the storage costs of the data is reduced, and access latency to the data included in the database is reduced. For example, the data included in the storage area corresponding to a relatively high heat level may be stored by using the solid-state disk, and the data included in the storage area corresponding to a relatively low heat level may be stored by using a mechanical disk. This is not limited in the present disclosure.

Figure 2:
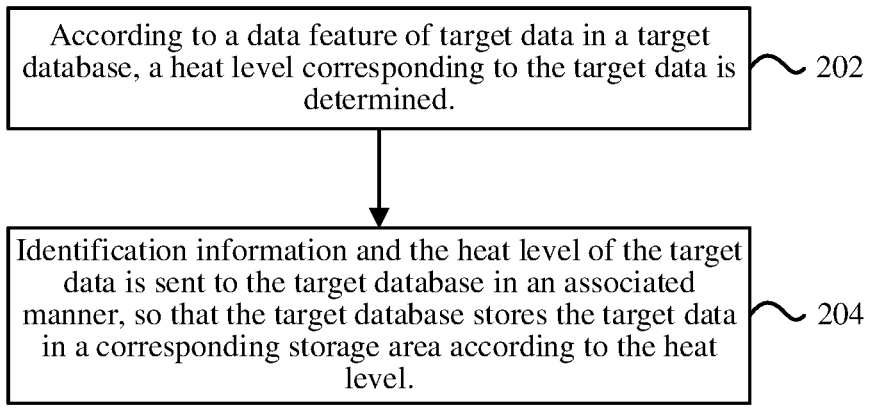
FIG. 2 is a flowchart of an example data partition storage method, according to some embodiments of the present disclosure.

FIG. 2 is a flowchart of a data partition storage method 200, according to some embodiments of the present disclosure. As shown in FIG. 2, method 200 may be applied to a data analysis device (for example, data analysis device 15 shown in FIG. 1). Method 200 includes steps 202 and 204.

At step 202, according to a data feature of target data in a target database, a heat level corresponding to the target data is determined.

In some embodiments, the data analysis device is configured to acquire an SQL log corresponding to the target data, and then the data analysis device is further configured to acquire the data feature of the target data by parsing the acquired SQL log. Changes of the target database during operation is recorded in the SQL log, and the SQL log may include a query log, an update log, a transaction log, and the like. This is not limited in the present disclosure. A target device forms a target database by deploying a corresponding database kernel. The target device is another electronic device different from the data analysis device.

In some embodiments, the data analysis device is configured to monitor storage modes of database tables in the target database. When the storage mode of any database table is configured as a partition storage mode, the data analysis device is configured to acquire a data feature of data included in the database table configured to be in the partition storage mode. Therefore, the data analysis device acquires, in a targeted manner, the data feature of the data included in the database table that requires partition storage, which can reduce a quantity of data features acquired by the data analysis device, and improve operation efficiency of the data analysis device.

In some embodiments, the data analysis device is configured to input the data feature of the target data into a pre-trained thermal analysis model, thereby acquiring the heat level of the target data outputted by the thermal analysis model. The thermal analysis model may be a neural network model such as a CNN model, an RNN model, or a GAN model. This is not limited in the present disclosure. The data analysis device is configured to predict the heat level of the target data by using the pre-trained thermal analysis model, which can improve accuracy of predicting the heat level of the target data. Meanwhile, the data analysis device is configured to determine the heat level of the target data, which can avoid the impact of the process of determining the heat level of the target data on database performance, avoid interference with the normal transaction processing process of the database, thereby improving the stability of the database. Alternatively, the data analysis device is further configured to accept an analysis result of the data feature of the target data provided by an external analysis object. The analysis result may include the heat level of the target data. The external analysis object may be another electronic device different from the data analysis device.

In some embodiments, the pre-trained thermal analysis model is obtained in the following manner. A sample data feature of each piece of sample data in a training sample set on a preset dimension is extracted, where each piece of sample data has been annotated with a corresponding actual heat level. Then, the sample data feature is inputted into the thermal analysis model to obtain a predicted heat level of each piece of sample data outputted by the thermal analysis model. In this way, a model parameter in the thermal analysis model is adjusted according to difference information between the actual heat level and the predicted heat level, and a trained thermal analysis model is obtained. The sample data in the training sample set includes historical data in the target database, and further includes data acquired from another device. The difference information includes a difference between the actual heat level and the predicted heat level, an absolute value of the difference between the actual heat level and the predicted heat level, or another comparison result between the actual heat level and the predicted heat level. This is not limited in the present disclosure.

In some embodiments, the database tables in the target database corresponds to a same thermal analysis model. The data analysis device is configured to sequentially input the acquired data feature into the thermal analysis model. Alternatively, different database tables in the target database corresponds to different thermal analysis models. Therefore, after acquiring the data feature of the target data, the data analysis device is configured to determine a database table to which the target data belongs, and input the data feature into a thermal analysis model of the database table to which the target data belongs, so that the accuracy of the predicted heat level corresponding to the target data outputted by the thermal analysis model can be ensured.

At step 204, identification information and the heat level of the target data is sent to the target database in an associated manner, so that the target database stores the target data in a corresponding storage area according to the heat level.

In some embodiments, the data analysis device is configured to send the identification information of the target data and the determined heat level of the target data to the target database in an associated manner. The target database is configured to store the target data to the corresponding storage area according to the heat level. Therefore, decoupling of the process of determining the heat level of the target data and the process of partition storage of the target data can be realized, the impact of the process of determining the heat level of the target data on database performance can be avoided, interference with the normal transaction processing process of the database is avoided, and the stability of the database is improved. The identification information of the target data may include a number of the target data or key content of the target data. This is not limited in the present disclosure.

Figure 3:
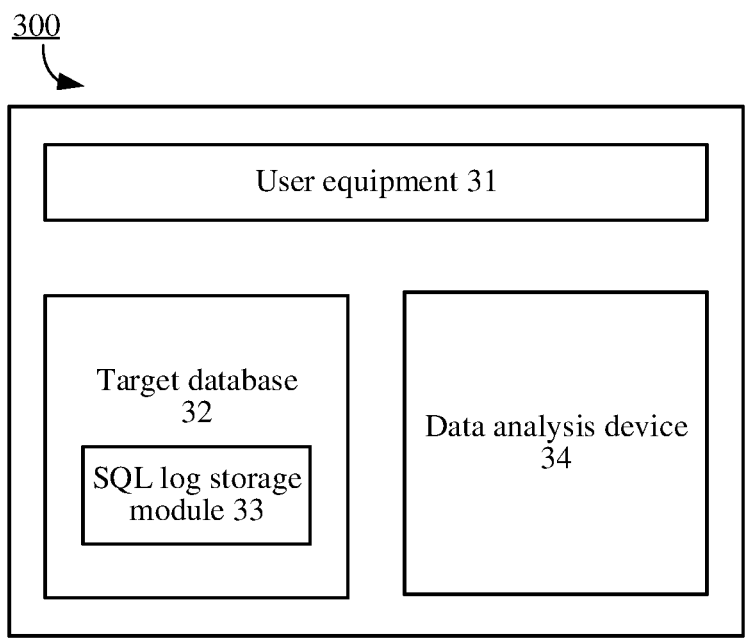
FIG. 3 is a schematic architectural diagram of an example data partition storage system, according to some embodiments of the present disclosure.

For ease of understanding, the technical solutions of the present disclosure are further described below with reference to the accompanying drawings. FIG. 3 is a schematic architectural diagram of a data partition storage system 300, according to some embodiments of the present disclosure. As shown in FIG. 3, data partition storage system 300 includes user equipment 31, a target database 32, an SQL log storage module 33, and a data analysis device 34. Assuming that target database 32 includes a hot data storage area and a cold data storage area. A heat level corresponding to the hot data storage area is a first level, and a heat level corresponding to the cold data storage area is a second level.

Data included in the hot data storage area needs to be frequently accessed, and data included in the cold data storage area does not need to be accessed or is rarely accessed. SQL log storage module 33 may be deployed on target database 32, and is configured to record changes of target database 32 during operation. In some embodiments, an SQL log is stored on another electronic device different from the target database 32. This is not limited in the present disclosure.

In some embodiments, different database tables in target database 32 correspond to different thermal analysis models and data analysis device 34 includes a thermal analysis model M for an order database table X in target database 32. The thermal analysis model M is pre-trained according to a training sample set. Sample data included in the training sample set is from historical data in the order database table X. Data analysis device 34 is configured to extract a sample data feature of each piece of sample data in the training sample set on two preset dimensions of an access frequency and a latest update time. Each piece of sample data is annotated with an actual heat level of the first level or the second level. The actual heat level is identified in a form of a text label or a score. The actual heat level of each piece of sample data is automatically annotated by data analysis device 34 by performing analysis according to log information corresponding to each piece of sample data acquired from the order database table X, or manually annotated by a user. This is not limited in the present disclosure.

Data analysis device 34 is configured to input the sample data feature extracted from the training sample set into the thermal analysis model, so as to determine whether a predicted heat level of each piece of sample data outputted by the thermal analysis model is the first level or the second level. Data analysis device 34 is further configured to adjust a model parameter in the thermal analysis model according to difference information between the actual heat level and the predicted heat level of each piece of sample data, so that an optimized thermal analysis model M is obtained. Therefore, the trained thermal analysis model M can predict the heat level corresponding to the data in the order database table X more accurately.

Figure 4:
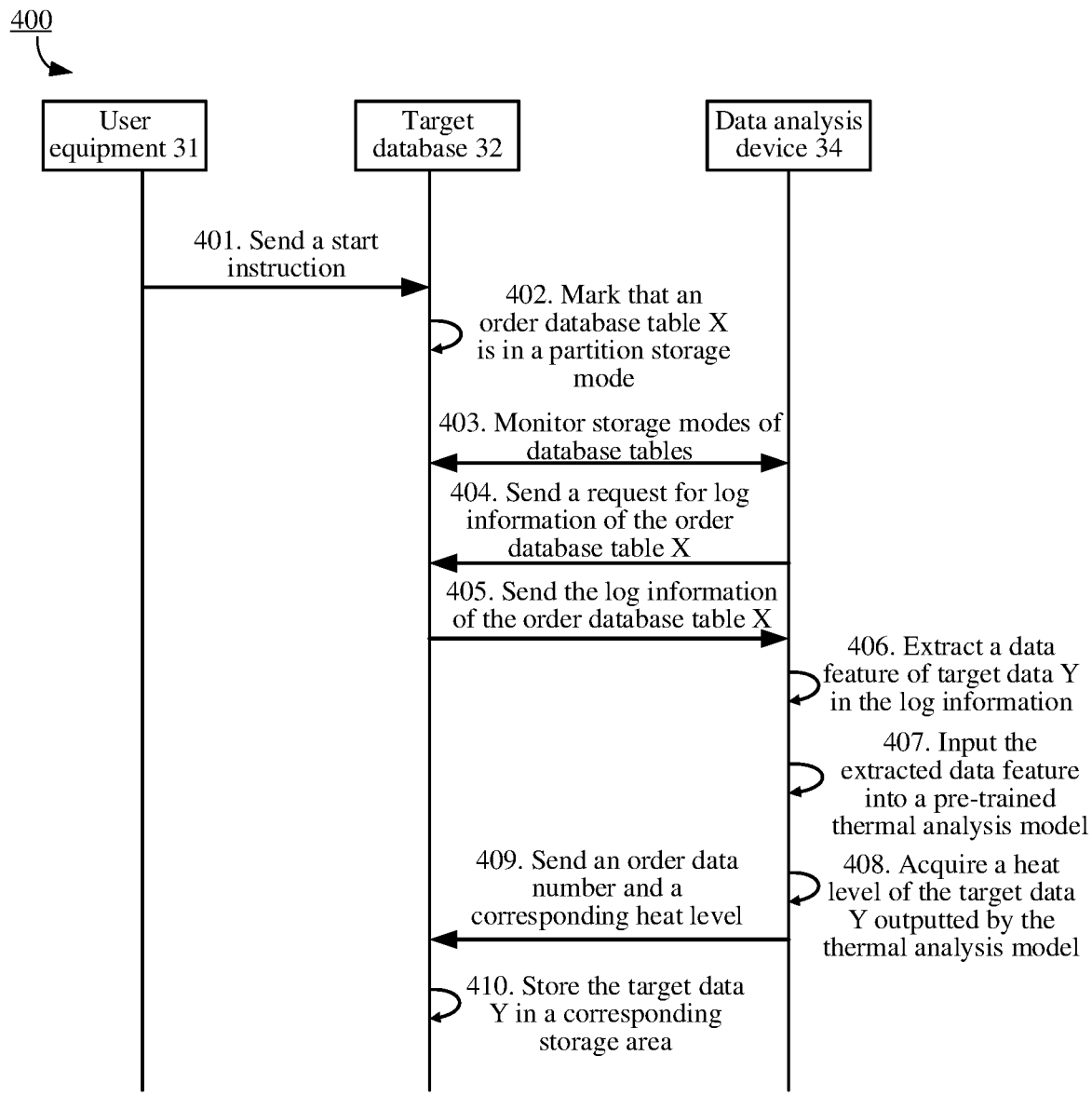
FIG. 4 is a flowchart of an example data partition storage method, according to some embodiments of the present disclosure.

FIG. 4 is a flowchart of a data partition storage method 400, according to some embodiments of the present disclosure. Also referring to FIG. 3, a description is made by using partition storage of the order database table X in target database 32 as an example. As shown in FIG. 4, the data partition storage method 400 includes steps 401 to 410.

At step 401, a start instruction is sent.

In this example, user equipment 31 sends a start instruction for the order database table X to target database 32 through a DDL statement. The start instruction may include switching a storage mode of the order database table X to a partition storage mode.

In some embodiments, the order database table X includes two storage modes: the partition storage mode and a rule storage mode. In the partition storage mode, target database 32 is configured to automatically store data included in the order database table X to the corresponding storage area respectively according to a received heat level of the data included in the order database table X. In the rule storage mode, target database 32 is configured to store the data included in the order database table X according to an acquired storage rule. The storage rule may be set according to an actual requirement. For example, the storage rule is that order data within 90 days is stored in a hot data storage area, while order data 90 days ago is stored in a cold data storage area, and the like.

At step 402, the order database table X being in the partition storage mode is marked.

In this example, an identification record is added to meta information of target database 32 according to the received start instruction. The identification record may be used for indicating that the storage mode of the order database table X is the partition storage mode.

At step 403, storage modes of each database table are monitored.

At step 404, a request for log information of the order database table X is sent.

At step 405, the log information of the order database table X is sent.

In this example, data analysis device 34 is configured to determine the storage modes of each database table in target database 32 by monitoring the meta information of target database 32. When the storage mode of order database table X is determined being the partition storage mode, data analysis device 34 is configured to send the request for the log information of the order database table X to target database 32.

In this example, target database 32 is configured to send all the log information of the order database table X stored in SQL log storage module 33 (as shown in FIG. 3) to data analysis device 34 according to the received request.

At step 406, a data feature of target data Y in the log information is extracted.

At step 407, the extracted data feature is inputted into a pre-trained thermal analysis model.

At step 408, a heat level of the target data Y outputted by the thermal analysis model is acquired.

In this example, data analysis device 34 is configured to determine that data features to be extracted are an access frequency and a latest update time according to the trained thermal analysis model M. Data analysis device 34 is further configured to determine the corresponding target data Y according to the acquired log information, for example, the target data Y includes order data corresponding to order data numbers 1-100 in the order database table X. Data analysis device 34 is configured to sequentially extract the data features of the target data Y included in the order database table X in the two dimensions of the access frequency and the latest update time from the acquired log information.

In this example, data analysis device 34 is configured to input the extracted data features of the target data Y in the two dimensions of the access frequency and the latest update time into the thermal analysis model M, so as to acquire that the heat level corresponding to the order data corresponding to the order data numbers 1-50 in the target data Y outputted by the thermal analysis model M is a first level, and the heat level corresponding to the order data with the order data numbers 51-100 is a second level.

At step 409, an order data number and the corresponding heat level are sent.

At step 410, the target data Y in the corresponding storage area is stored.

In this example, data analysis device 34 is configured to send the acquired order data number and the corresponding heat level to target database 32 in an associated manner. In some embodiments, data analysis device 34 is configured to only send the acquired order data number corresponding to a certain heat level to target database 32, which is not limited in the present disclosure.

In this example, target database 32 is configured to store the order data corresponding to the order data numbers 1-50 in the order database table X into the hot data storage area according to that the received heat level of the order data numbers 1-50 is the first level, and store the order data corresponding to the order data numbers 51-100 in the order database table X into the cold data storage area according to that the received heat level of the order data numbers 51-100 is the second level.

In this example, when the data included in the order database table X has been stored in the hot data storage area and the cold data storage area respectively, target database 32 is further configured to determine a current storage area 01 of the order data corresponding to the order data number 1-50 and a current storage area 02 of the order data corresponding to the order data number 51-100 in the order database table X respectively. If the current storage area 01 is the cold data storage area, the corresponding order data is migrated to the hot data storage area. If the current storage area 02 is the hot data storage area, the corresponding order data is migrated to the cold data storage area.

Figure 5:
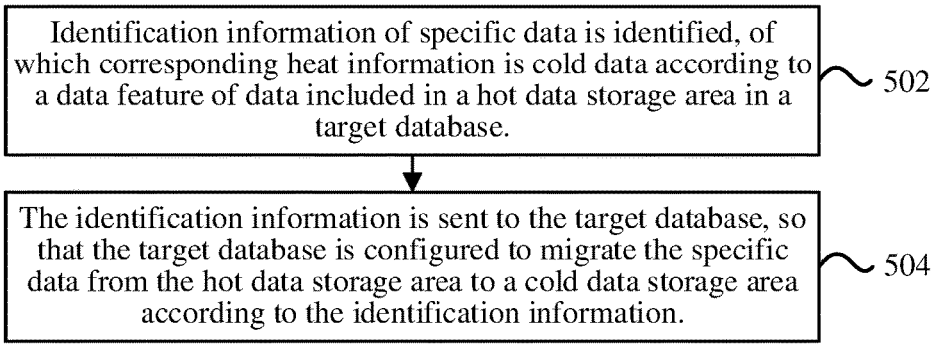
FIG. 5 is a flowchart of an example data partition storage method, according to some embodiments of the present disclosure.

FIG. 5 is a flowchart of a data partition storage method 500, according to some embodiments of the present disclosure. As shown in FIG. 5, the method 500 may be applied to a data analysis device (for example, data analysis device 15 shown in FIG. 1), and the method 500 includes the steps 502 and 504.

At step 502, identification information of specific data is identified, of which corresponding heat information is cold data according to a data feature of data included in a hot data storage area in a target database.

At step 504, the identification information is sent to the target database, so that the target database is configured to migrate the specific data from the hot data storage area to a cold data storage area according to the identification information.

In some embodiments, the heat information corresponding to the hot data storage area is hot data, while the heat information corresponding to the cold data storage area is cold data. The data analysis device only needs to send the identified identification information of the specific data to the target database, and the target database can find the specific data from the hot data storage area according to the identification information, so that the specific data can be migrated to the cold data storage area.

The specific implementation process of step 502 and step 504 is similar to that in the example shown in FIG. 2, and details are not described herein again.

Figure 6:
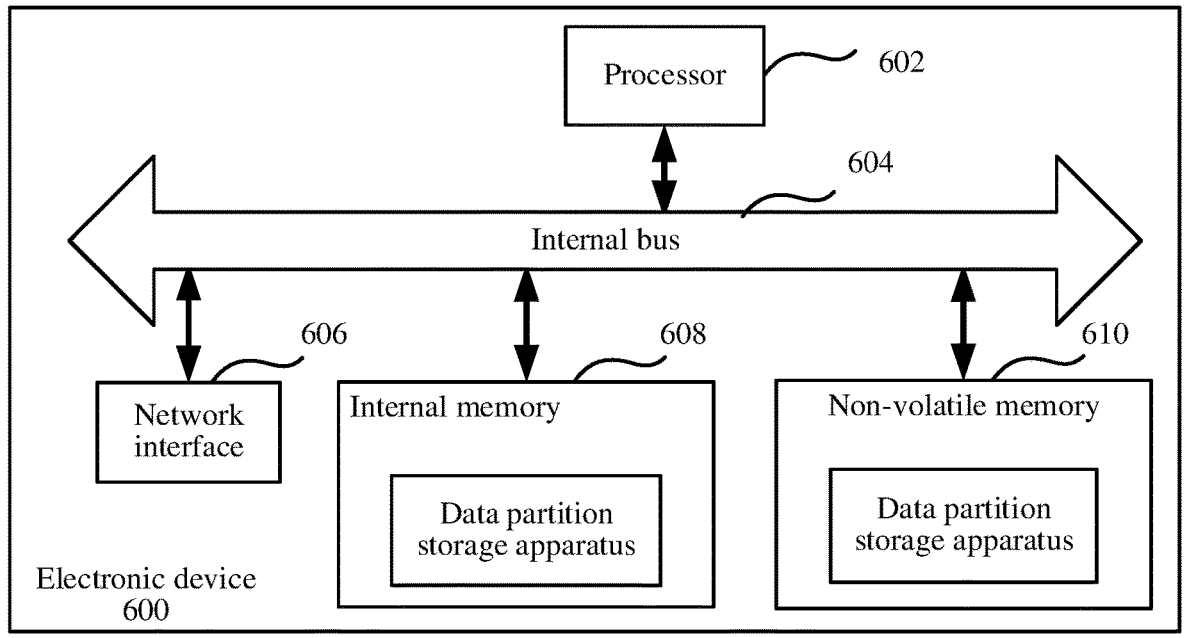
FIG. 6 is a schematic structural diagram of an example electronic device, according to some embodiments of the present disclosure

FIG. 6 is a schematic structural diagram of an electronic device 600, according to some embodiments of the present disclosure. Referring to FIG. 6, at the hardware level, electronic device 600 includes a processor 602, an internal bus 604, a network interface 606, an internal memory 608, and a non-volatile memory 610. In some embodiments, electronic device 600 may further include hardware required for other services. Processor 602 is configured to read a corresponding computer program from non-volatile memory 610 into internal memory 608 and execute the computer program, to form a data partition storage apparatus at a logic level. In some embodiments, in addition to a software implementation, one or more embodiments of the present disclosure do not exclude other implementations, for example, logic devices or a software-hardware combination. That is, execution entities of the following processing procedures are not limited to logic units and may alternatively be hardware or logic devices.

Figure 7:
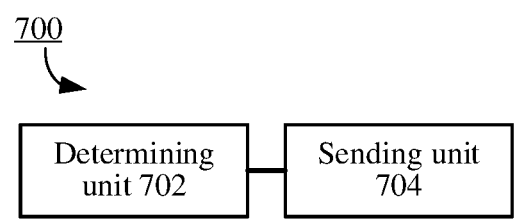
FIG. 7 is a block diagram of an example data partition storage apparatus, according to some embodiments of the present disclosure.

FIG. 7 is a block diagram of a data partition storage apparatus 700, according to some embodiments of the present disclosure. Referring to FIG. 7, in a software implementation, the data partition storage apparatus 700 includes a determining unit 702 and a sending unit 704.

Determining unit 702 is configured to determine, according to a data feature of target data in a target database, a heat level corresponding to the target data.

Sending unit 704 is configured to send identification information and the heat level of the target data to the target database in an associated manner, so that the target database stores the target data in a corresponding storage area according to the heat level.

In some embodiments, determining unit 702 is further configured to: acquire an SQL log corresponding to the target data; and determine the data feature of the target data by parsing the SQL log.

In some embodiments, determining unit 702 is further configured to monitor storage modes of database tables in the target database, and acquire a data feature of data included in any one of the database tables when the storage mode of the any one of the database tables is configured as a partition storage mode.

In some embodiments, determining unit 702 is further configured to input the data feature of the target data into a pre-trained thermal analysis model and obtain the heat level of the target data outputted by the thermal analysis model.

In some embodiments, determining unit 702 is further configured to sequentially input the data feature into the thermal analysis model when the database tables in the target database correspond to a same thermal analysis model; and when different database tables in the target database correspond to different thermal analysis models, determine a database table to which the target data belongs, and input the data feature into a thermal analysis model corresponding to the database table to which the target data belongs.

In some embodiments, the thermal analysis model is obtained by training in the following manner: extracting a sample data feature of each piece of sample data in a training sample set on a preset dimension respectively, where each piece of sample data is annotated with a corresponding actual heat level; inputting the sample data feature into the thermal analysis model to obtain a predicted heat level of each piece of sample data outputted by the thermal analysis model; and adjusting a model parameter in the thermal analysis model according to difference information between the actual heat level and the predicted heat level to obtain the trained thermal analysis model.

In some embodiments, the sample data in the training sample set includes historical data in the target database.

Figure 8:
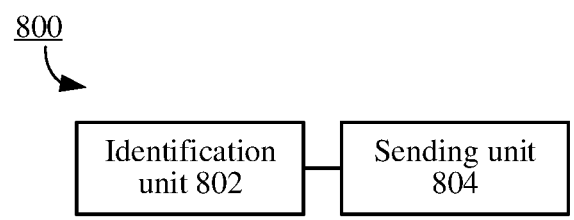
FIG. 8 is a block diagram of an example data partition storage apparatus, according to some embodiments of the present disclosure.

FIG. 8 is a block diagram of another data partition storage apparatus 800, according to some embodiments of the present disclosure. Referring to FIG. 8, in a software implementation, the data partition storage apparatus 800 includes an identification unit 802 and a sending unit 804.

Identification unit 802 is configured to identify identification information of specific data of which corresponding heat information is cold data according to a data feature of data included in a hot data storage area in a target database.

Sending unit 804 is configured to send the identification information to the target database, so that the target database migrates the specific data from the hot data storage area to a cold data storage area according to the identification information.

The embodiments may further be described using the following clauses:

1. A data partition storage system, comprising:
   a data analysis device, configured to determine, according to a data feature of target data comprised in a database, a heat level corresponding to the target data; and
   a database kernel, deployed on a target device different from the data analysis device to form the database, and configured to:
      acquire the heat level corresponding to the target data transmitted by the data analysis device; and
      store the target data in a storage area corresponding to the heat level.

2. The system according to clause 1, wherein the data analysis device is further configured to acquire the data feature of the target data comprised in the database by performing:
   acquiring an SQL log corresponding to the target data; and
   determining the data feature of the target data by parsing the SQL log.

3. The system according to clause 2, further comprises a log storage device configured to store the SQL log of the database acquired from the target device; and in acquiring the SQL log corresponding to the target data, the data analysis device is further configured to:
   acquire the SQL log corresponding to the target data from the log storage device.

4. The system according to clause 1, wherein in the determining the heat level corresponding to the target data, the data analysis device is further configured to:
   input the acquired data feature of the target data into a thermal analysis model is pre-trained; and
   obtain the heat level of the target data outputted by the thermal analysis model.

5. The system according to clause 4, further comprises a heat level prediction device comprising the thermal analysis model; and in obtaining the heat level of the target data outputted by the thermal analysis model, the data analysis device is further configured to:
   receive the heat level of the target data sent by the heat level prediction device, the heat level being outputted by the thermal analysis model in the heat level prediction device.

6. The system according to clause 1, wherein in storing the target data in the storage area corresponding to the heat level, the database kernel is further configured to:
   determine a current storage area at which the target data is located; and
   migrate the target data to the storage area corresponding to the heat level when the heat level does not match the current storage area.

7. The system according to clause 1, wherein a speed at which the database kernel accesses the storage area is positively related to the heat level corresponding to the storage area.

8. The system according to clause 1, wherein the data analysis device is further configured to acquire the data feature of the target data comprised in the database by:
   monitoring storage modes of each database table in the database by polling meta information in the database; and
   deriving a sub-process for a database table of which the corresponding storage mode is a partition storage mode, to obtain a data feature of data comprised in the database table.

9. The system according to clause 1, wherein the data analysis device is further configured to:
   generate a target file comprising identification information and the heat level of the target data; and
   transmit the target file to the target device, so that the database kernel in the target device stores the target data in the storage area corresponding to the heat level according to the target file.

10. The system according to clause 1, wherein the data analysis device is further configured to:
send a notification message of data migration to the target device after the heat level corresponding to the target data is determined; and
the database kernel is configured to migrate the target data to the storage area corresponding to the heat level after receiving the notification message.

11. A data partition storage method, applied to a data analysis device, comprising:
determining, according to a data feature of target data in a target database, a heat level corresponding to the target data; and
sending identification information and the heat level of the target data to the target database in an associated manner, so that the target database stores the target data in a corresponding storage area according to the heat level.

12. The method according to clause 11, wherein the data feature of the target data in the target database is acquired by:
acquiring an SQL log corresponding to the target data; and
determining the data feature of the target data by parsing the SQL log.

13. The method according to clause 11, wherein the data feature of the target data in the target database is acquired by:
monitoring storage modes of database tables in the target database; and
acquiring a data feature of data comprised in any one of the database tables when the storage mode of the any one of the database tables is configured as a partition storage mode.

14. The method according to clause 11, wherein the determining, according to the data feature of target data in the target database, the heat level corresponding to the target data further comprises:
inputting the data feature of the target data into a pre-trained thermal analysis model to obtain the heat level of the target data outputted by the thermal analysis model.

15. The method according to clause 14, wherein the inputting the data feature of the target data into a pre-trained thermal analysis model further comprises:
when the database tables in the target database correspond to the same thermal analysis model, sequentially inputting the data feature into the thermal analysis model; and
when different database tables in the target database correspond to different thermal analysis models, determining a database table to which the target data belongs, and inputting the data feature into a thermal analysis model corresponding to the database table to which the target data belongs.

16. The method according to clause 14, wherein the thermal analysis model is trained by:
extracting a sample data feature of each piece of sample data in a training sample set on a preset dimension, wherein each piece of sample data is annotated with a corresponding actual heat level;
inputting the sample data feature into the thermal analysis model to obtain a predicted heat level of each piece of sample data outputted by the thermal analysis model; and
adjusting a model parameter in the thermal analysis model according to difference information between the actual heat level and the predicted heat level to obtain the trained thermal analysis model.

17. The method according to clause 16, wherein the sample data in the training sample set comprises historical data in the target database.

18. A data partition storage method, applied to a data analysis device, comprising:
identifying identification information of specific data of which corresponding heat information is cold data according to a data feature of data comprised in a hot data storage area in a target database; and
sending the identification information to the target database, so that the target database migrates the specific data from the hot data storage area to a cold data storage area according to the identification information.

19. A data partition storage apparatus, comprising:
a determining unit, configured to determine, according to a data feature of target data in a target database, a heat level corresponding to the target data; and
a sending unit, configured to send identification information and the heat level of the target data to the target database in an associated manner, so that the target database stores the target data in a corresponding storage area according to the heat level.

20. A data partition storage apparatus, comprising:
an identification unit, configured to identify identification information of specific data of which corresponding heat information is cold data according to a data feature of data comprised in a hot data storage area in a target database; and
a sending unit, configured to send the identification information to the target database, so that the target database migrates the specific data from the hot data storage area to a cold data storage area according to the identification information.

21. An electronic device, comprising:
a processor; and
a memory configured to store instructions executable by the processor, wherein the processor executes the executable instructions to implement the method according to any one of clauses 11 to 18.

22. A computer-readable storage medium, storing computer instructions, the instructions, when executed by a processor, implementing steps in the method according to any one of clauses 11 to 18.

The system, the apparatus, the module or the unit described in the foregoing embodiments may be specifically implemented by a computer chip or an entity, or implemented by a product having a certain function. A typical implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device or a combination of any devices of these devices.

In a typical configuration, the computer includes one or more processors (for example, CPUs), an input/output interface, a network interface, and an internal memory.

The internal memory may include a form such as a volatile memory, a random-access memory (RAM) and/or a non-volatile internal memory such as a read-only memory (ROM) or a flash RAM in a computer-readable medium. The internal memory is an example of the computer-readable medium.

In some embodiments, a non-transitory computer-readable storage medium including instructions is also provided, and the instructions may be executed by a device, for performing the above-described methods (e.g., the example methods corresponding to FIGS. 2, 4, and 5). Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be further noted that the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Without further limitation, the element defined by a phrase "include one" does not exclude other same elements existing in the process, method, article, or device that includes the element.

The terms used in one or more embodiments of the present disclosure are merely used to describe the particular embodiments but are not intended to limit one or more embodiments of this specification. The "a", "the", and "this" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like may be used to describe various information in one or more embodiments of the present disclosure, such information should not be limited to these terms. These terms are merely used to distinguish the same type of information from each other. For example, without departing from the scope of one or more embodiments of the present disclosure, first information may also be referred to as second information. Similarly, the second information may also be referred to as the first information. Depending on the context, for example, the word "if" used herein may be interpreted as "while" or "when," or "in response to determination."

It should be noted that, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A data partition storage system, comprising:
a data analysis device comprising one or more processors and configured to:
determine, according to a data feature of target data comprised in a database, a heat level corresponding to the target data; and
monitor storage modes of each database table in the database by polling meta information in the database to determine the database table configured in a partition storage mode or a rule mode; and
a target device comprising one or more processors and configured to execute a database kernel of the data partition storage system to form the database, wherein the database kernel is deployed on the target device, and the database kernel is executed to:
acquire the heat level corresponding to the target data transmitted by the data analysis device; and
store the target data in a storage area corresponding to the heat level according to the configured storage mode of the database table;
wherein the target device is decoupled from a process of the determining the heat level of the target data.

2. The system according to claim 1, wherein the data analysis device is further configured to acquire the data feature of the target data comprised in the database by performing:
acquiring an SQL log corresponding to the target data; and
determining the data feature of the target data by parsing the SQL log.

3. The system according to claim 2, further comprising a log storage device comprising one or more processors and configured to store the SQL log of the database acquired from the target device; and in acquiring the SQL log corresponding to the target data, the data analysis device is further configured to:

acquire the SQL log corresponding to the target data from the log storage device.

4. The system according to claim 1, wherein in the determining the heat level corresponding to the target data, the data analysis device is further configured to:

input the acquired data feature of the target data into a thermal analysis model is pre-trained; and obtain the heat level of the target data outputted by the thermal analysis model.

5. The system according to claim 4, further comprising a heat level prediction device comprising the thermal analysis model; and in obtaining the heat level of the target data outputted by the thermal analysis model, the data analysis device is further configured to:

receive the heat level of the target data sent by the heat level prediction device, the heat level being outputted by the thermal analysis model in the heat level prediction device.

6. The system according to claim 1, wherein in storing the target data in the storage area corresponding to the heat level, the database kernel is further executed to:

determine a current storage area at which the target data is located; and migrate the target data to the storage area corresponding to the heat level when the heat level does not match the current storage area.

7. The system according to claim 1, wherein a speed at which the database kernel accesses the storage area is positively related to the heat level corresponding to the storage area.

8. The system according to claim 1, wherein the data analysis device is further configured to acquire the data feature of the target data comprised in the database by:

deriving a sub-process for a database table of which the corresponding storage mode is the partition storage mode, to obtain a data feature of data comprised in the database table.

9. The system according to claim 1, wherein the data analysis device is further configured to:

generate a target file comprising identification information and the heat level of the target data; and transmit the target file to the target device, so that the database kernel in the target device stores the target data in the storage area corresponding to the heat level according to the target file.

10. The system according to claim 1, wherein the data analysis device is further configured to:

send a notification message of data migration to the target device after the heat level corresponding to the target data is determined; and the database kernel is configured to migrate the target data to the storage area corresponding to the heat level after receiving the notification message.

11. A data partition storage method, applied to a data analysis device, comprising:

determining, according to a data feature of target data in a target database, a heat level corresponding to the target data;

monitoring storage modes of each database table in the database by polling meta information in the database to determine the database table configured in a partition storage mode or a rule mode;

sending identification information and the heat level of the target data to the target database in an associated manner; and storing the target data, in the target database, in a corresponding storage area according to the heat level according to the configured storage mode of the database table; wherein a process of the determining the heat level of the target data and a process of the storing the target data is decoupled.

12. The method according to claim 11, wherein the data feature of the target data in the target database is acquired by:

acquiring an SQL log corresponding to the target data; and determining the data feature of the target data by parsing the SQL log.

13. The method according to claim 11, wherein the data feature of the target data in the target database is acquired by:

acquiring a data feature of data comprised in any one of the database tables when the storage mode of the any one of the database tables is configured as the partition storage mode.

14. The method according to claim 11, wherein the determining, according to the data feature of target data in the target database, the heat level corresponding to the target data further comprises:

inputting the data feature of the target data into a pre-trained thermal analysis model to obtain the heat level of the target data outputted by the thermal analysis model.

15. The method according to claim 14, wherein the inputting the data feature of the target data into a pre-trained thermal analysis model further comprises:

when the database tables in the target database correspond to the same thermal analysis model, sequentially inputting the data feature into the thermal analysis model; and when different database tables in the target database correspond to different thermal analysis models, determining a database table to which the target data belongs, and inputting the data feature into a thermal analysis model corresponding to the database table to which the target data belongs.

16. The method according to claim 14, wherein the thermal analysis model is trained by:

extracting a sample data feature of each piece of sample data in a training sample set on a preset dimension, wherein each piece of sample data is annotated with a corresponding actual heat level;

inputting the sample data feature into the thermal analysis model to obtain a predicted heat level of each piece of sample data outputted by the thermal analysis model; and adjusting a model parameter in the thermal analysis model according to difference information between the actual heat level and the predicted heat level to obtain the trained thermal analysis model.

17. The method according to claim 16, wherein the sample data in the training sample set comprises historical data in the target database.

18. The method according to claim 11, further comprising:

identifying identification information of specific data of which corresponding heat information is cold data according to the data feature of data comprised in a hot data storage area in the target database; and sending the identification information to the target database, so that the target database migrates the specific data from the hot data storage area to a cold data storage area according to the identification information.

19. A non-transitory computer readable medium that stores a set of instructions that is executable by one or more processors of an apparatus to cause the apparatus to perform:
- determining, according to a data feature of target data in a target database, a heat level corresponding to the target data;
- monitoring storage modes of each database table in the database by polling meta information in the database to determine the database table configured in a partition storage mode or a rule mode;
- sending identification information and the heat level of the target data to the target database in an associated manner; and
- storing the target data, in the target database, in a corresponding storage area according to the heat level according to the configured storage mode of the database table; wherein a process of the determining the heat level of the target data and a process of the storing the target data is decoupled.

20. The non-transitory computer readable medium of claim 19, wherein the set of instructions that is executable by one or more processors of an apparatus to cause the apparatus to further perform:
- identifying identification information of specific data of which corresponding the heat level is cold data according to the data feature of data comprised in a hot data storage area in the target database; and
- sending the identification information to the target database, so that the target database migrates the specific data from the hot data storage area to a cold data storage area according to the identification information.

* * * * *